May 22, 1956  R. R. STRATTON ET AL  2,746,679
APPARATUS AND SYSTEMS FOR AUTOMATICALLY
RECORDING, CLASSIFYING, TOTALIZING
AND AUDITING BUSINESS TRANSACTIONS
Filed May 3, 1950  5 Sheets-Sheet 1

Inventor
R. Russell Stratton
William P. Munger
By
C. E. Beach,
Attorney

May 22, 1956
R. R. STRATTON ET AL
2,746,679
APPARATUS AND SYSTEMS FOR AUTOMATICALLY
RECORDING, CLASSIFYING, TOTALIZING
AND AUDITING BUSINESS TRANSACTIONS
Filed May 3, 1950
5 Sheets-Sheet 2
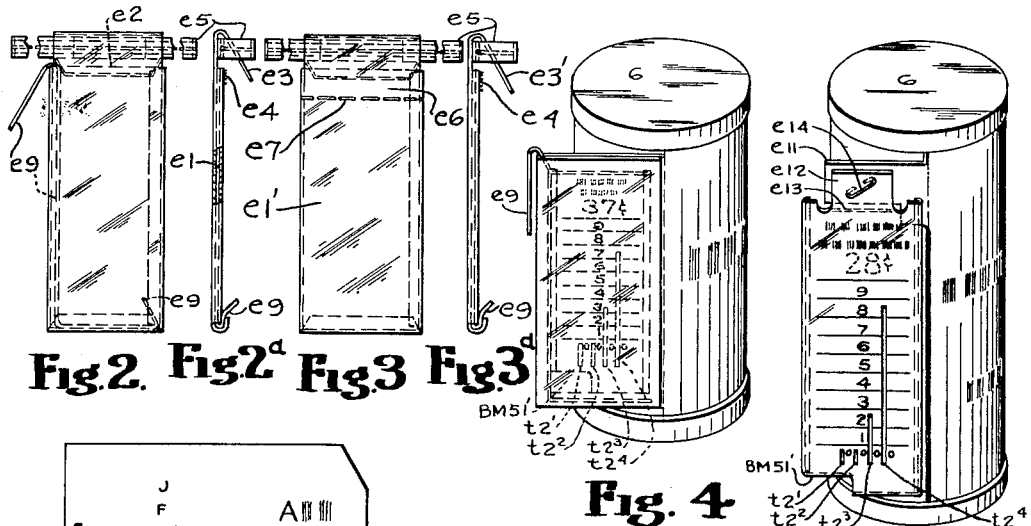
Fig.2. Fig.2ᵈ Fig.3 Fig.3ᵈ Fig.4 Fig.5
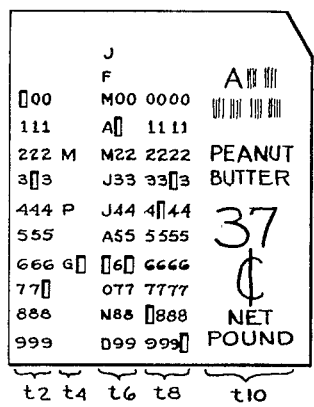
Fig.6
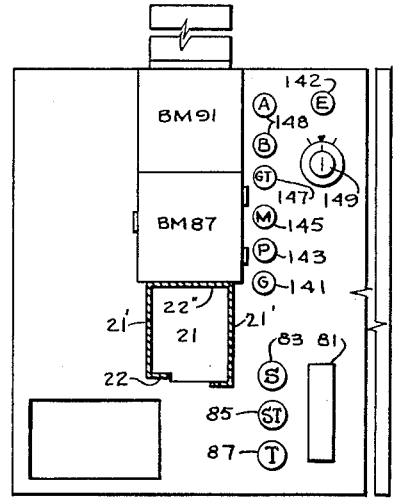
Fig.8
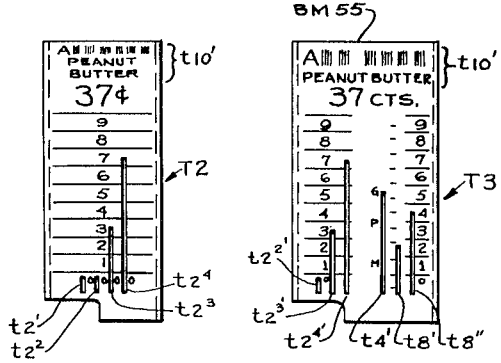
Fig.9 Fig.10
Inventor
R. Russell Stratton
William P. Munger
By C. E. Beach
Attorney May 22, 1956
R. R. STRATTON ET AL
2,746,679
APPARATUS AND SYSTEMS FOR AUTOMATICALLY
RECORDING, CLASSIFYING, TOTALIZING
AND AUDITING BUSINESS TRANSACTIONS
Filed May 3, 1950
5 Sheets-Sheet 3
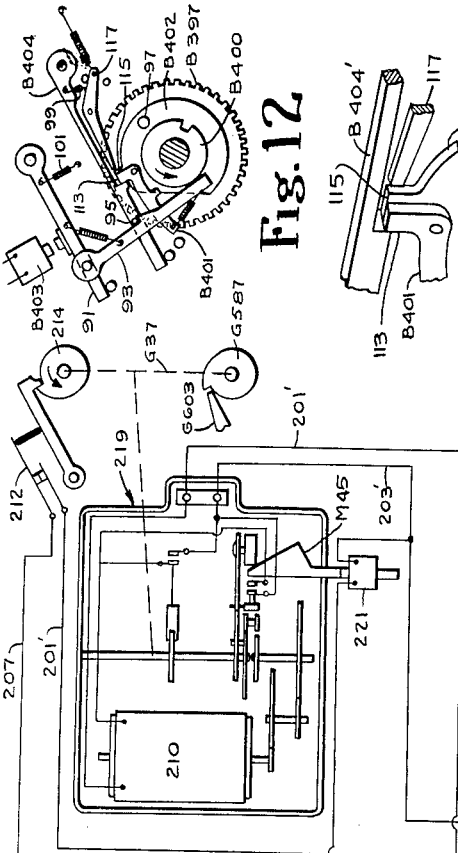
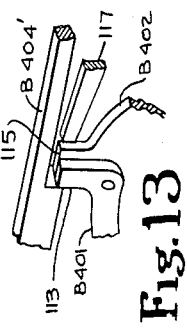
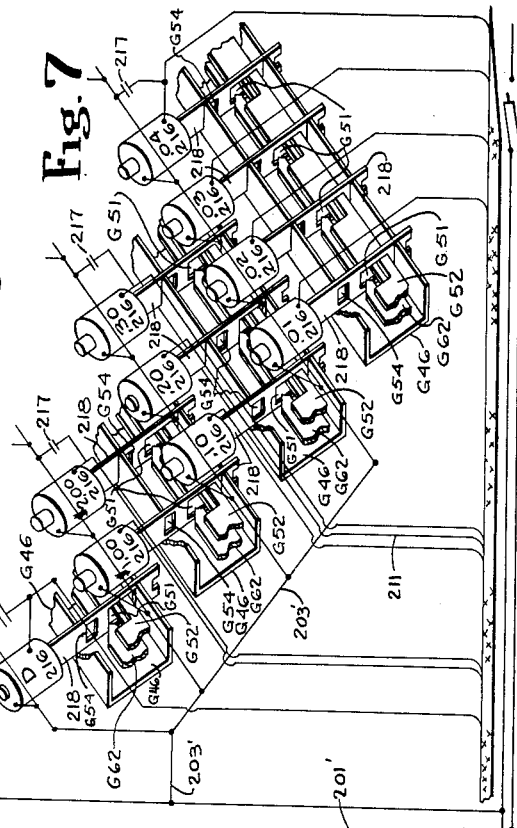
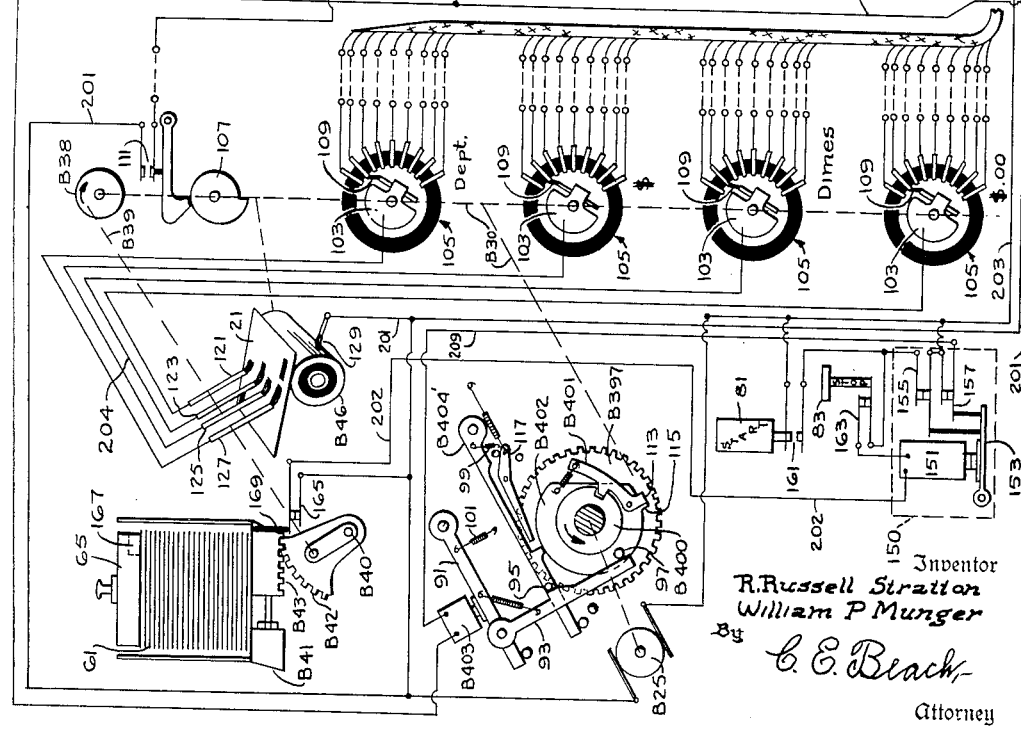
Inventor
R. Russell Stratton
William P Munger
By
C. E. Beach
Attorney

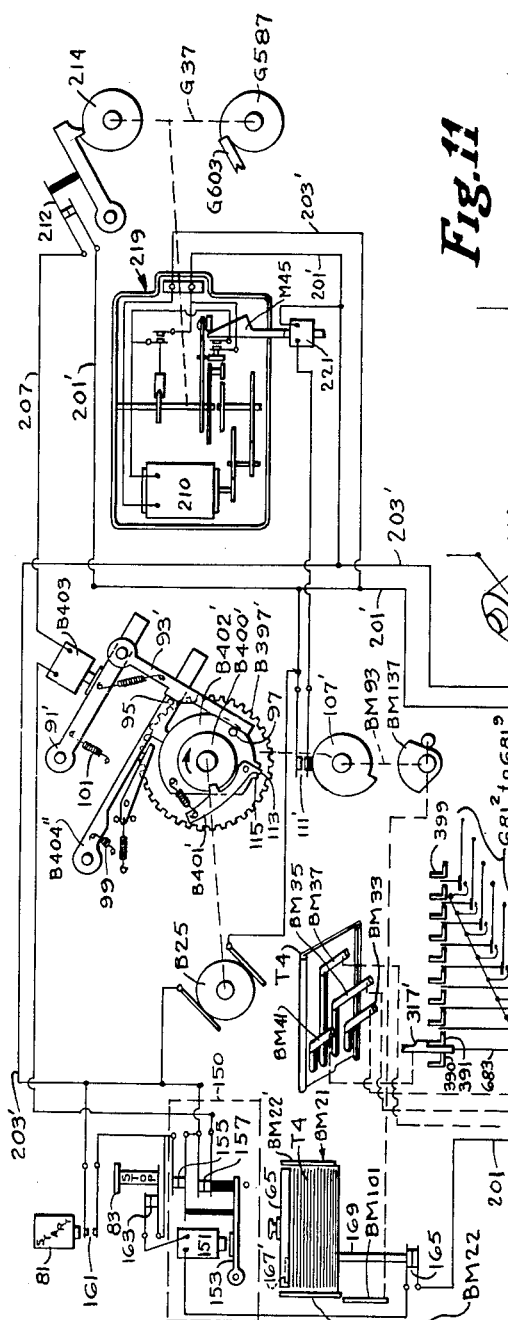
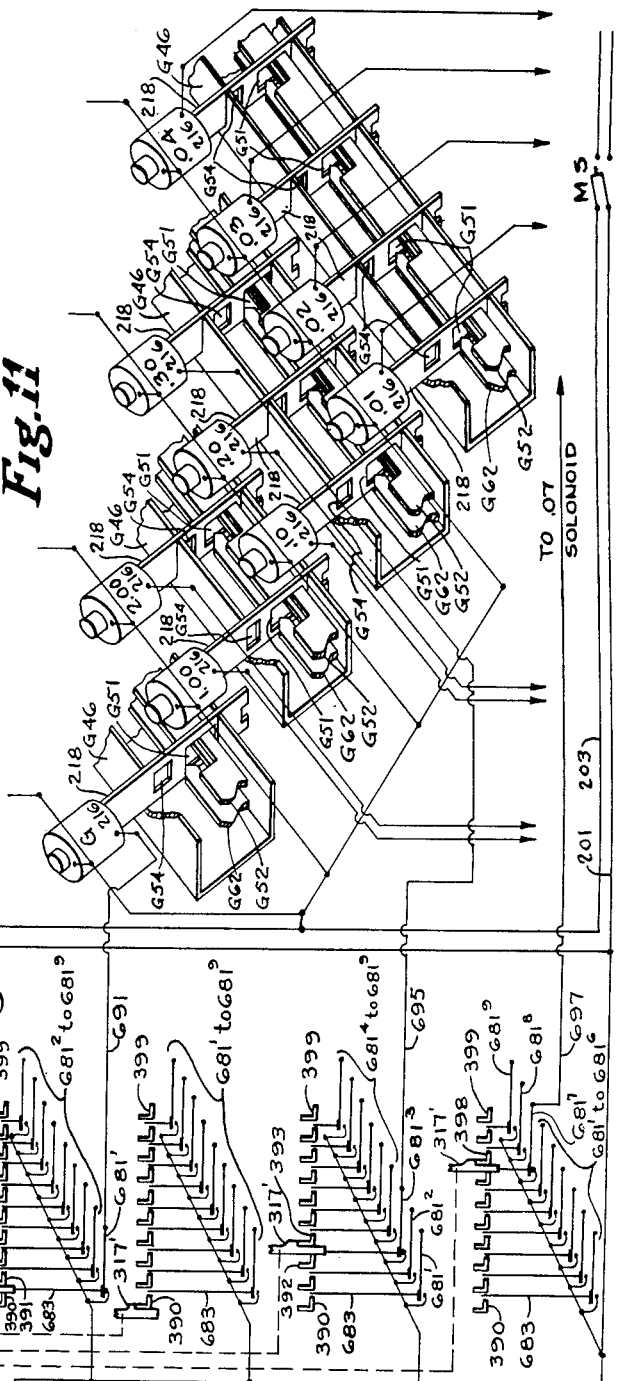
Fig. 11
Inventors
R. Russell Stratton
William P. Munger
By C. E. Beach
Attorney May 22, 1956

R. R. STRATTON ET AL 2,746,679

APPARATUS AND SYSTEMS FOR AUTOMATICALLY
RECORDING, CLASSIFYING, TOTALIZING
AND AUDITING BUSINESS TRANSACTIONS

Filed May 3, 1950

Inventors
R. Russell Stratton
William P. Munger
By C. E. Beach,
Attorney

United States Patent Office 2,746,679
Patented May 22, 1956

2,746,679

APPARATUS AND SYSTEMS FOR AUTOMATICALLY RECORDING, CLASSIFYING, TOTALIZING AND AUDITING BUSINESS TRANSACTIONS

Robert Russell Stratton and William P. Munger, Binghamton, N. Y., assignors, by direct and mesne assignments, of one-half to Clarence E. Beach, Binghamton, N. Y.

Application May 3, 1950, Serial No. 159,692

9 Claims. (Cl. 235—61.6)

This invention relates, generally, to apparatus and systems for automatically recording, classifying, totalizing and auditing business transactions; and, more particularly, to apparatus and systems for automatically accomplishing detailed recordal of individual purchases, each of which purchases may comprise a plurality of items; with provision of facilities for classifying such items by subjects or by departments of origination; provision of facilities for recordal and/or totalization of sums of prices of items in each transaction, as well as detailed recordal and summation of cashier's transactions; together with provision of facilities suited for embodiment independently or in various combinations for automatically or semi-automatically accomplishing all needful computations with reference to commercial transactions such as commonly occur or may advantageously take place in stores, warehouses, restaurants, hotels, or elsewhere.

For convenience and brevity of expression, the word "mart" will, in some instances, be hereinafter used to designate retail stores and other places where commercial transactions are or may be consummated; such, for example, as those just enumerated.

Cash registers of various types are widely used. Some of such registers are of a type suited for what may be termed "single item transactions" and others are of a type suited for what may be termed "multiple item transactions."

Prior cash registers of both of these types rely, for correctness of results, upon manual actuation of keys, levers or equivalent devices for causing the amount of the transaction and/or its component items to be displayed and/or accumulated in one or more totalizers.

Many such cash registers also include correspondingly manipulatory mechanism for designating characteristics of items which constitute or enter into transactions, as by indicating character of goods sold or the department from which the goods were sold.

Because the accuracy and dependability of statistics presented by the totalizers and/or the records afforded by such cash registers is entirely dependent upon the correctness of the user's manipulations of the various keys, levers or other devices, such records are subject to errors of diverse character and magnitude.

Fatigue, inattention and lack of adequate training of users result in extensive losses, and render the statistics presented by totalizers and records likely to prove confusing rather than helpful in disclosing departmental efficiency and comparative profitability of transactions involving diversities of goods.

In connection with the foregoing characteristics of cash registers heretofore used, it should be recognized that, in many situations (such as in large food stores, to cite but a single example), the user (such as a checker or a cashier) is called upon to rapidly handle a very large number of items; and, as to each of these items, to read price markings (which are sometimes partially obliterated or otherwise difficult to decipher), or else to refer to schedules or depend upon memory as to item prices.

In addition to this, in many situations, such users are called upon to make further determinations or conclusions, as to the department which should be credited for sales values of the various units of merchandise sold (as, to again take the case of a food store, to classify each item by originating departments such as Grocery, canned goods, tea and coffee, cereals, baked goods, dairy and candy; Produce, fresh vegetables, frozen foods, dried fruits and nuts; Meats, fish and poultry; and the like).

When mistakes in item prices are made, incident to the use of prior cash registers, if the result is an overcharge, the customer is likely to notice it and ask for a rectification either at the time or later. Even if the matter is finally adjusted to the satisfaction of the customer, ill will against the store is likely to result. More serious still, when mistakes result in undercharge, there is little likelihood that the matter will be so corrected as to cause the full amount to be received by the store.

Correspondingly, errors in allocating sales to various departments may have very serious results. Thus, when sales figures are incorrectly classified, it may be made to appear that an unprofitable department, or one which is little more than breaking even, is showing a substantial profit; while the department or departments accidentally or maliciously deprived of sales-price credits may be caused to show unmerited losses or impairments of actual profits.

It is, therefore, a major object of this invention to provide apparatus, mechanism and facilities whereby substantially all results, such as heretofore obtainable by detailed manual actuations of cash registers, may be accomplished with rapidity and practically unerring accuracy, without occasion for the cashiers, checkers or other users to sense, or to make any decisions or conclusions with reference to price values involved or as to any questions of classification of component items, and whereby opportunity for omission of component items will be minimized.

Another object, and one which is of distinct importance in the attainment of the foregoing objects, is to provide structures which may be severally utilized to represent transactions or items of transactions; including, in such representations, sales-prices (as of various units or articles of merchandise) and any and all indicia representative of classifications and/or other subjects which may be of significance with reference to recordal or distributions to totalizers. As a matter of convenience, and for want of a better term, such structures will, at times, be hereinafter referred to as "tokens."

It is a further object, to provide tokens, as aforesaid, having perforated or cut-away, raised or depressed areas suited for use in connection with sensing mechanism for causing recordal and/or totalization of sums of price values and classifications, as well as of all other matters for which records and/or summations should be provided; and, furthermore, of such character that such tokens may be available in variety and number sufficient to provide for any and all intended transactions or items.

It is another object to provide tokens having at least some of the characteristics common to cards adapted for use in what are termed "card analyzing devices" and "tabulating machines," while having other characteristics which render such tokens particularly suited for uses in accordance with this invention.

Contemplated methods of utilization of such tokens, as hereinafter described in greater detail, are, under many circumstances, such that the tokens will be subject to handling by stock-men, clerks, checkers and cashiers, and, most serious of all, by customers. Because of exposures to such handlings, tokens of no greater sturdiness than cards usually heretofore provided for analyzing devices and for tabulating machines would be likely to become damaged or impaired to an extent such as would render them incapable of dependably attaining the intended results.

In this connection, it should be remembered that it has been found needful that cards, such as heretofore provided for use in such devices and machines, shall be so stored and handled as to minimize opportunity for exposure to excessive moisture (even guarding against wide variations in atmospheric humidity) as well as being guarded against exposure to handling by unskilled persons or those hostile to attainment of dependable resultant records. In contrast with such safeguarding, many of the conditions of token use, for which this invention is intended, are such that the tokens employed will not only be exposed to moisture and to handling by untrained and disinterested persons, but will also be exposed to handling by persons who might expect to profit by effecting alteration and mutilation of tokens; as, for example, to thereby effect recordal, indication and/or inclusion in totalizer results, of item prices less than in those intended.

It is, therefore, a further important object to provide, in tokens and in a machine or apparatus having sensing mechanism for response to such tokens, structural characteristics which will minimize opportunities for accidentally or maliciously effecting alterations of such tokens whereby to cause improper or unintended response of such apparatus and mechanism to such tokens when applied thereto.

It is another object to provide formation of tokens, and a character of token receiving structure of the machine, whereby tokens can be introduced into the machine only when disposed in such relation thereto as to assure intended response of the sensing mechanism.

It is another object to provide formation of tokens and receiving apparatus and sensing mechanism therefor, as aforesaid, whereby such tokens may conveniently and rapidly be stacked for consecutive responsive sensing in a manner which will assure presentation of each token, in its turn, in correct relationship with the sensing mechanism.

It is a further object to provide mechanism suited for association with a machine which accomplishes the foregoing objects, which mechanism will automatically act to suspend or "lock up" response of the associated machine to tokens and prevent consequent computations, in the event that any token presented thereto for sensing has been altered, as by depressing a raised portion, restoring a depressed portion or filling in, clogging or closing any depressed or cut-away area, whereby there would be impairment of correctness of result, as to either price-amount or classification of response of the sensing mechanism; and to correspondingly act in the event that a supplemental raised, depressed or cut-away condition has been produced in an area such as to be calculated to affect the results of the action of the sensing mechanism.

It is a further object to provide a variety of types of sensing mechanisms suited for interchangeable or alternative utilization, for response to tokens of diverse structural characteristics such as, for example, molded plastic material, sheet metal, and/or fiber or so-called "pressboard."

It is a further object to devise a form of token or tablet such that processing and completion of what may be termed "token blanks" may be readily and expeditiously effected (as at local stores) by the use of simple mechanism; thereby to condition such blanks to serve for causing analyzers constructed in accordance with this invention to produce records and effect totalizations and classifications thereof suited for any one of a wide variety of utilization circumstances.

It is a further object to provide tokens and mechanism for response thereto of a character such that legends descriptive of goods will be printed on tapes or other records produced by the machine responsive to such tokens.

It is a further object to provide mechanism suited for association with that provided in fulfilment of the foregoing objects whereby the final summation of each transaction will be conspicuously displayed.

It is another important object of this invention to provide mechanism whereby each of the items of a transaction represented by a plurality of tokens as aforesaid, together with summation of the transaction, will be printed on a tape which will be automatically ejected or may be manually removed after the summation of the transaction.

It is a further object to provide mechanisms for independently accomplishing various ones of the foregoing objects which mechanisms may be added to or omitted from other mechanisms in any given machine, without thereby incurring necessity for significant alteration in the structure of mechanisms to which they are added or from which they are omitted.

It is a still further object to provide structural characteristics of tokens and of the machines for scanning and sensing the indicia presented by such tokens, whereby to accomplish so-called "freshness control," as hereinafter more fully explained.

With these and various incidental and other objects in view, the invention includes certain novel features of construction, relative arrangement and combinations of parts, the essential elements of which are set forth in the appended claims, and illustrative forms or embodiments of which are hereinafter described with reference to the drawings which accompany and form part of this specification.

Similar reference characters are used to designate like or corresponding parts throughout said drawings, in which:

Figure 1 shows a self-service food mart which is equipped with record indicia tokens representative of merchandise units, together with an analyzer for sensing certain of the indicia presented by such tokens and an associated cash register for recording, displaying and suitably entering in various totalizers prices of merchandise units represented by tokens sensed by the analyzer, all in accordance with certain of the more general aspects of this invention;

Figs. 2, 2a, 3, 3a, 4 and 5 are illustrative of a variety of methods of associating tokens with merchandise units;

Fig. 6 shows a Hollerith type of card suited for use as a token pursuant to this invention, with certain types of merchandise units;

Fig. 7 is a view, partly in diagrammatic form, of analyzer mechanism suited for response to Hollerith type token cards, with parts positioned at an intermediate stage of an operative cycle and of cash register mechanism responsively associated therewith;

Fig. 8 is a plan view of the deck of the analyzer of Fig. 1, with certain parts shown in section;

Fig. 9 shows a slotted type of token with indicia representative of a four digit unit price;

Fig. 10 shows such a slotted token with indicia supplemental to that shown by Fig. 9 for departmental and freshness control designations;

Fig. 11 is a view, partly in diagrammatic form, of an analyzer for response to slottings of tokens of types such as shown in Figs. 9 and 10, for governing cash register mechanism such as that shown in Fig. 7;

Fig. 12 shows the single cycle clutch mechanism of Fig. 7, with parts in home positions;

Fig. 13 is an enlarged fragmentary view of certain parts of the mechanism shown in Fig. 12;

Figure 1:
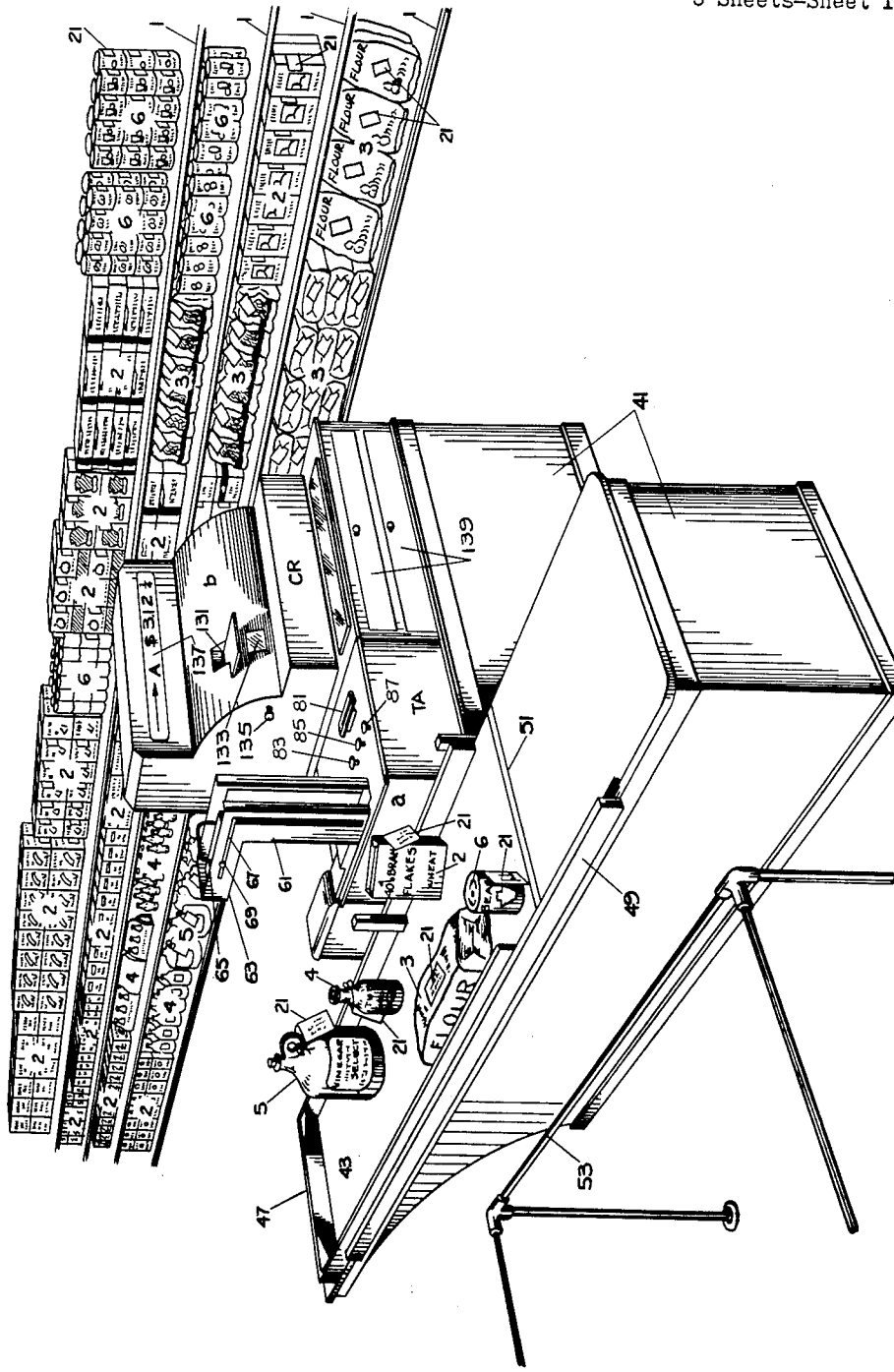
Figure 14:
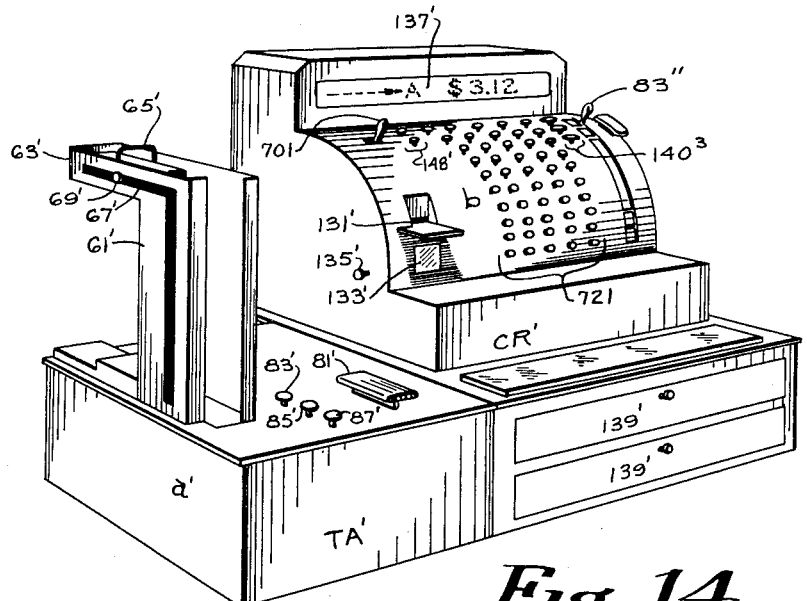
Figure 15:
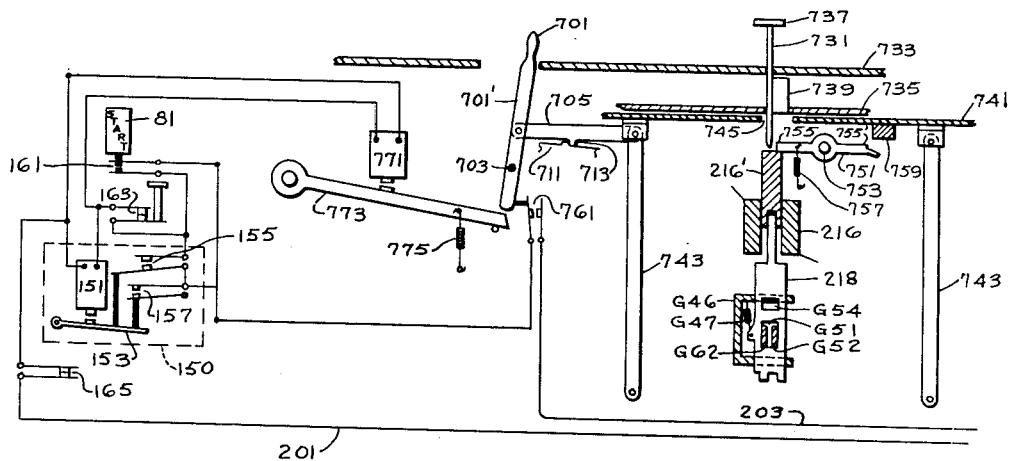

Fig. 14 is a perspective view of a cash register equipped with a conventional group of manually operable keys, in association with the token analyzer of Fig. 1; and Fig. 15 is a view, mostly in diagrammatic form, showing a form of mechanism and associated circuit conductors subject to manual conditioning for alternatively rendering the register mechanism exclusively responsive to the finger keys or to token analyzer.

As an example illustrative of the adaptability of this invention for utilization under widely divergent circumstances, a food mart is shown in Fig. 1, which mart embodies certain of the broader or more general aspects of this invention.

The mart of Fig. 1, has shelving 1 which supports a variety of merchandise items, including cartons 2, as of cereals; sacks 3, as of flour, salt, sugar or other similar bulk substances; bottles 4, as of milk or beverages; jugs 5, as of vinegar; and cans 6, as of corn or beans.

Tokens 21 are generally indicated in association with respective merchandise items. Said tokens may consist of record media of any of a variety of forms and/or types, and may be associated in various manners, inclusive of, but not limited to, the examples shown in Figs. 2 to 5, inclusive; which examples will be hereinafter referred to in greater detail.

The pedestal 41 supports mechanism comprising a token scanner or analyzer TA and a cash computor or register CR in functionally interconnected association therewith.

A checkout stand 43 is also associated with the pedestal 41 in convenient relation to said analyzer TA; which analyzer is here shown as situated between said cash register and said stand.

A frame or expeditor 47 is supported by and slides freely along the top surface of said stand 43, between a side of the casing a of the analyzer TA and the rail 49, so that articles which have been placed upon the rearward portion of said stand may readily be positioned within easy reach by a checker standing in front of the analyzer TA.

With the arrangement thus far described, customers are enabled to select desired goods and to carry them, in a basket, in a little truck, or otherwise, to and place them upon the stand 43, whereupon the cashier, clerk or checker can readily collect tokens from the various articles so assembled, and submit such tokens for sensing or analysis by the analyzer TA, in a manner which will be hereinafter more fully explained.

Articles which have been thus checked are thereafter moved along the stand 43, to a position forward of the line 51.

Customers pass between the stand 43 and the railing 53, while computation is being effected of the sum of the prices of the selected items which have been placed upon this stand.

Considered collectively, the analyzer TA and the register CR provide means for accomplishing cycles of action, which cycles comprise: sequentially receiving a plurality of tokens and acting to consecutively sense indicia represented by respective ones of tokens so received; manually operable means for initiating trains of such sensing actions; listing of expressions of indicia so sensed; causing termination of such receiving, sensing and listing activities; and thereafter computng, entering and recording a summation of expressions so listed.

The accomplishment of some of the broader or more general features of this invention, in token analyzers such as TA and in cash registers such as CR may be attained by the use of structure which constitutes extensions of and additions to devices and structural details which are well known to persons who are skilled in the art of equipment for scanning record media, as found in tabulating and sorting machines, such, for example, as disclosed in Patent No. 2,424,076, dated July 15, 1947, to Buhler, and/or Patent No. 2,464,569, dated March 15, 1949, to Ford, and/or Patent No. 2,472,890, dated June 14, 1949, to Ford; as well as cash register mechanism such as disclosed in Patent No. 2,175,346, dated October 10, 1939, to Goldberg and/or Patent No. 2,226,919, dated December 31, 1940, to Gubelman.

In order to simplify the present disclosure and to set forth more clearly the improvements represented by a number of the broader aspects of the present invention, certain of the apparatus and equipment of the aforesaid patents are diagrammatically represented in drawings of this case, the disclosures of the aforesaid patents being incorporated herein by reference.

The token analyzer TA of Fig. 1 comprises a magazine or chute 61 in which tokens may be stacked prior to processing by sensing mechanism situated within the casing a; which mechanism will be hereinafter referred to in greater detail. The upper portion of said chute 61 has a rearwardly offset portion 63 for at times providing a support for the weight 65.

The slot 67 in a wall of the chute 61 provides a runway for the stud 69 which projects from the adjacent wall of the weight 65; there being a like slot and stud at the other side of said chute.

Said analyzer is further provided with a bar 81 which may be pressed to cause starting of token analyzing action; a button or key 83 for interrupting repetitions of such action; a button or key 85 for causing the associated mechanism to determine and display the sum of the price or prices represented by an intended token or by any series of such tokens which have been consecutively analyzed, without incidentally clearing such sum from the transaction totalizer; and a button or key 87 for causing the associated cash register mechanism to finally determine, record, display, and introduce into what might be termed a "grand totalizer" or into a "cashier's totalizer," the price or the sum of the prices represented by such token or by any such series of tokens, and to thereupon clear the transaction totalizer; all as will be hereinafter more fully explained.

For convenience, references will at times be hereinafter made to an instrumentality such as 81 as a "starting bar"; to a button or key such as 83 as a "stopping key"; to a button or key such as 85 as a "sub-total key"; and to a button or key such as 87 as a "transaction total key."

The analyzer may be equipped with additional keys as for causing designation of one cashier or another, as in ordinary cash register practice. Inasmuch as the provision of such keys and the manner of their association with commonly used types of cash registers, and the operation thereof, is well-known to those skilled in this art, such keys are not shown in the accompanying drawings and will not be further herein described.

The cash register mechanisms CR may comprise mechanism of one or another of various general types with which persons skilled in the cash register art are well acquainted. For convenience, the exterior appearance here shown is more or less schematically representative of, and is assumed to contain mechanism along lines such as that customarily provided in, cash registers of types ordinarily used in food marts as, for example, of the so-called "chain store" type. However, the cash register here shown differs from those heretofore so employed in that it is not equipped with so-called "finger keys" for manual actuation. Instead, this register comprises means, responsive to the analyzer TA, for actuating parts which, in prior cash registers, have been operable by actuation of such finger keys; as will be presently explained in greater detail.

It should also be understood that facilities are further also provided for ascertaining sums of items entered in the various totalizers of the cash register CR. Such facilities may be provided in the cash register mechanism, as in various usual forms of cash registers; and, when so provided, form no part of this invention, and are therefore not shown or herein described in detail. Facilities in the cash register mechanism for accomplishing such results may also be rendered responsive to keys mounted upon the analyzer, as will be hereinafter referred to in greater detail, with reference to Fig. 8.

An orifice 131, in one of the front walls of this register, provides for delivery therethrough of a strip of paper or tape upon which has been printed the prices of items represented by tokens analyzed for a given transaction, together with the sum of such prices; as is customary in various well-known types of cash registers.

A window 133 is provided below the orifice 131 through which may be observed a tape, such as tapes which are frequently termed "audit strips"; and the usual handle 135 may be provided for propelling such audit strip past this window.

Windows such as 137 extend along both sides of the upper portion of said register, and one or another of various well-known types of structure is provided for causing display of numerals and legends through these windows, thereby to express either sub-totals or final totals of item prices entering into transactions, together with desired cashier's and departmental designations, all in accordance with usual practices.

The cash register mechanism may also provide means for causing display through windows 137 of each of the various prices of items entering into transactions, together with departmental designations, as in past cash register practices; however, inasmuch as cash register actuations accomplished from sensing or analysis of tokens in accordance with this invention will occur with far greater rapidity than is attainable through the use of present methods of examination of merchandise items and resultant actuation of cash register keys by clerk or checker, such display of item prices and departmental designations by an equipment such as that indicated in Fig. 1 is unlikely to be of significant advantage.

For convenience in operation of equipments such as that shown in Fig. 1, the starting bar 81 and the stopping, sub-total and transaction total keys 83, 85 and 87 thus far referred to, should be supplemented, on the deck of the analyzer TA, by facilities for use in ascertaining sums of items entered in the various totalizers of the cash register CR. For example, the key 141 (Fig. 8) may be used when it is desired to ascertain the sum of the entries in the "groceries" totalizer; the key 143 for the "produce" totalizer, the key 145 for the "meat" totalizer, and the key 147 for the "grand" totalizer.

A so-called "error" or canceling key 142 may be provided for restoring keys such as 141, 143, 145 and 147, in the event that one of such keys has been depressed at a time when it is not desired to ascertain a total or a sub-total for the department or totalizer represented by such accidentally pressed key.

Keys such as 148, 148 may also be provided for representing one or another of a plurality of cashiers.

It is desirable that controlling means, such as the lock 149, be associated with the departmental, grand total and cashier's keys in such manner that, when the mechanism of this lock is in normal or intermediate position, the analyzer and register may be used in the course of ordinary transactions. When given another position by the use of an intended key, all functions of both the analyzer and the register will be suspended (as, by causing discontinuance of electric current supply); and, when correspondingly set in a third position, departmental, grand and cashier's totals may be ascertained, in the customary manner.

For most circumstances of use, it will be desirable that the associated departmental and grand total keys will be rendered incapable of effective actuation other than when the lock is in the "totals" position; and so that the key of the manager or other responsible person cannot be removed from the lock while it is set for "totals" but can be removed during settings of either "use" or "lock."

The character of token indicia for the sensing of which the analyzer TA of Fig. 1 is suited, has thus far herein been referred to as if limited to merely expressing prices of units of merchandise and departmental designations (as might be of special utility in a self-service food store or in a cafeteria), such seeming limitation has been made as a matter of convenience only.

It is believed that it will be apparent to those skilled in this art that such indicia could advantageously be employed for supplementally expressing various other matters, inclusive of specific identifications of different merchandise items and/or designations of degree of freshness; and/or for expressing units of quantities for purposes of periodic or perpetual inventories, hours of labor or other units upon which compensation for services should be computed, disbursements of funds, insurance of various types written or premiums collected thereon, as well as many other purposes of character more or less analogous to the foregoing.

As hereinbefore indicated, practice of certain important aspects of this invention may be facilitated by suitable association of tokens with individual units of the various articles of mecrchandise; as by readily disengageable attachment thereto, interspersing between adjacent surfaces of folded materials, or otherwise. Thus, for example, tokens could be suitably attached (as by stapling) to projecting edges of wrappers of each of the loaves of a given kind of bread, which tokens would be representative of a 15 cent purchase price; or, correspondingly, each group of three cans of some soup (suitably fastened together) could have detachably associated with them a 29 cent token. Similarly, throughout the stock of goods, there would be tokens representative of the purchase prices of each separately salable unit of merchandise.

*Association of tokens with goods*

Examples of methods of associating tokens with merchandise units are presented in Fig. 1; and a greater variety of such methods is shown, on enlarged scale and in more detail, in Figs. 2, 2a, 3, 3a, 4 and 5.

For many purposes, transparent envelopes may be advantageously used for associating tokens with units of merchandise, such, for example, as the envelope shown in Figs. 2 and 2a.

The envelope of Figs. 2 and 2a provides a compartment e1 initially having an opening along one edge (as at e2) to facilitate insertion of an intended token.

The edge e3 is folded over upon the outer surface of the rear wall, after insertion of the token, and may be secured by heat-sealing, by the use of an adhesive, as e4, or by applying one or more staples through this folded over portion.

Prior to such sealing, a cord or tape e5 may be inserted under the folded over edge e3, to facilitate fastening the envelope to a bottle, to the tied-in neck of a bag, or to various other units of merchandise.

A rip cord e9 may be utilized for affording quick access to tokens.

In the envelope shown in Figs. 3 and 3a, structure such as that of the envelope of Fig. 2 is supplemented by a tab e6, which tab is readily separable from the main portion e1', of the envelope along the perforations e7.

The bent over portion e3' provides a channel e8 for receiving a cord or tape such as e5 after the seal e4 has been applied.

Reinforced paper tapes are commercially available which consist of parallel strips of paper fastened together on opposite sides of a metal wire or strip; and which are of such character that the ends of such tapes can be quickly twisted together, in the course of attachment to merchandise units.

Such reinforced tapes are specially suited for use with the envelopes of Figs. 3 and 3a, in that they may be readily inserted through the channel e8 provided in the tab e6.

Detachment of the main envelope portion e1' from the tab e6, along the perforations e7, gives ready access to the enclosed token.

For some purposes, it will be found desirable to apply serial numbers to tabs and envelopes for the purpose of facilitating identification of merchandise units from which envelopes have been detached.

Envelopes such as those of Figs. 2 and 2a may be formed integral with projecting portions of labels of cans or other commodities, as indicated in Fig. 4.

Tokens may also be associated with merchandise items as indicated in Fig. 5, in which a strip *e*11 projects from the label or wrapper of each unit of certain types of merchandise, and the tokens used are provided with tabs *e*12 from which they can be readily severed by tearing along the perforation *e*13; such tabs being fastened to the strips *e*11 as by means of staples *e*14.

It will be readily understood that adhesive may be used for attaching tokens or their envelopes to units of merchandise, in place of the cords or tapes contemplated by Figs. 2 and 3, as well as in place of the staples *e*14 of Fig. 5.

Hollerith type tokens

The tokens themselves may consist of record media cards having perforations such as used in cards of the so-called Hollerith type, which are commonly used in a wide variety of accounting, tabulating and sorting machines.

Fig. 6 shows an example of such a card in which data-expressing perforations of a well-known type may be made in the fields *t*2, *t*4, *t*6 and *t*8; and the field *t*10 is provided for printing or otherwise marking therein a legend specifically and conspicuously identifying the represented merchandise unit and the unit price thereof.

It will be evident that the perforations in the field *t*2 represent an amount; as, for example, the price of the merchandise unit to be associated with this token.

Departmental designation letters are provided in the left hand column of field *t*4 (as M for meat, P for produce and G for groceries), and the perforations in the right hand column of this field designate one or another of such letters as representative of the intended merchandise unit.

The letters in the left hand column of the field *t*6 are initials of the various months of the year, and the numerals in the second and third columns of this field may be used to represent days of the indicated month in one or another of three different years.

The numerals in field *t*8, considered in connection with the departmental designations in field *t*4, serve as a code to identify the associated merchandise unit.

It will be noted that, in the specimen token T1 of Fig. 6, the punchings in field *t*2 (0.37) agree with the price legend of 37¢ printed in the field *t*10.

The punching in field *t*4 (designating letter G) indicates that the associated merchandise unit is classified as "groceries."

The punchings in field *t*6 (which express S16) may represent a so-called "freshness control" code; such, for example, as September 16th of the current year, as being the latest date upon which it is desirable that the peanut butter unit shall be considered salable.

The punchings in field *t*8 (8439) are assumed to be in conformity with a code (which should be interpreted with references to the punching in field *t*4) which code designates a one-pound unit of peanut butter of a particular brand; which unit is also described in the legend printed in field *t*10.

Fig. 7 mechanism

Mechanism of a diversity of types may be provided within the casing *a* of the analyzer TA, and within the casing *b* of the cash register CR shown in Fig. 1. Various types of analyzer and cash register mechanisms capable of embodiment in forms more or less suitable for use in said casings *a* and *b* are well-known both with regard to their construction and their operation.

Assuming at this time, but only for purposes of illustration, that the mechanism of the analyzer TA is suited for sensing the price indicia of Hollerith type tokens such as the token T1 shown in Fig. 6, reference will be specially made to the aforementioned Buhler Patent No. 2,424,076. Certain instrumentalities shown by this patent are diagrammatically indicated in the left hand portion of Fig. 7, and are here identified by numbers corresponding to those used in said Buhler patent for identifying analogous parts; such numbers being here supplementally prefixed by the letter "B."

For corresponding purposes, reference will be specially made to the aforementioned Gubelman Patent No. 2,226,919, in describing certain instrumentalities of the cash register CR which are diagrammatically indicated in the right hand portion of Fig. 7, and are there identified by numbers corresponding to those used in said Gubelman patent for identifying analogous parts; such numbers being here supplementally prefixed by the letter "G."

It should be understood that, during closure of switch MS, the motor B25 acts (through suitable connecting mechanism, not shown) to continuously drive the clutch element B400. In the same plane as this element, there is a dog B401 which is pivoted to a disk B402. This disk drives the gear B397.

Upon energization of the magnet B403, its armature lever 91, acting through the drag bar 93 and the pin 95, will move the latch B404' out of the path of both the projection 115 which is carried by the disk B402, and the tail 113 of the dog B401; thereby leaving said disk free to rotate and permitting said dog to engage the clutch element B400 to thereby cause rotation of the gear B397.

Such rotation of the disk B402 will cause the pin 97 carried thereby to act upon the free end of the drag bar 93 and thereby effect disengagement of said bar from the pin 95; whereupon the spring 99 will move the latch B404' into the paths of both the tail 113 and the projection 115, thereby to serve, at the end of the operative cycle, to cause withdrawal of the dog B401 from the notch in said disk and to block the path of said projection 115, thereby to effect termination of the rotation of said disk B402 and of the gear B397 at the conclusion of one revolution thereof.

The latch 117 is provided in the path of the projection 115, to serve for preventing excessive rebound of the disk B402 when the projection 115 strikes the latch B404'.

Subsequent de-energization of the magnet B403 will permit the spring 101 to move the armature lever 91 to retracted position, whereupon the bar 93 will be positioned for effectively engaging the pin 95 when magnet B403 is next energized.

The rotors 103 of the selectors 105 rotate with the shaft B30. These selectors are of a conventional form such, for example, as selectors diagrammatically indicated in various drawings of the aforesaid Buhler patent (i. e., that shown in Buhler's Fig. 39), except in that applicants' rotors 103 are of the single brush variety, such as indicated in Buhler's Figs. 49d, 49e and at "E5" in his Fig. 49f.

A cam 107 also moves with the shaft B30 and is so positioned thereon that, during a cycle of rotation of said shaft, when the brushes 109 have passed beyond their associated contacts representing numeral 9, said cam 107 will effect a temporary closure of the contacts 111; the reopening of said contacts occurring just before the rotation of the shaft B30 is arrested resultant from the projection 115 carried by the disk B402 encountering the latch B404'.

A disk B38 rotates with the shaft B30 and acts through an eccentric pin and link connection B39 to oscillate a shaft B40 which, in turn, acting through the gear sector B42 and the toothed slide B43, causes needful reciprocation of the card picker B41.

The picker B41 advances the lowermost card in the magazine 61 through the usual throat to a conducting roller B46, which roller cooperates with usual rows of sensing brushes, here exemplified by the pens 121, 123, 125 and 127; current being supplied to the roller B46 through the brush 129.

In addition to sensing of token indicia representative of price and departmental designations, as just described, facilities may be provided for sensing of supplemental token indicia (such as that indicated in fields t6 and t8 of the token T1 of Fig. 6); which indicia may be sensed either by the analyzer in course of usual processing of tokens with reference to price and departmental designations, or by another machine through which the tokens are passed subsequent to such processing; to thereby effect sorting of tokens by the use of mechanism such as heretofore provided in tabulating and sorting machines.

The relay 150 consists of a magnet 151 and its armature lever 153, together with a set of lock-up contacts 155 and a set of register start controlling contacts 157; both of which sets of contacts are closed responsive to attracted positioning of said lever 153.

A set of analyzer starting contacts 161 are associated for closure by actuation of the starting bar 81; and analyzer stopping contacts 163 are associated for separation thereof responsive to actuation of the stopping key 83.

Contacts 165 are mounted adjacent the lower end of the magazine 61, and the bar 169 extends from one of these contacts into said magazine. A recess 167 is formed in the lower surface of the weight 65, so that the bar 169 may rise into this recess, and thereby permit separation of said contacts, when there is no token between the weight and said bar. A token below said weight will act through said bar to cause closure of said contacts.

Motor mechanism is provided for effecting operative cycles of the cash register. It is deemed unnecessary to indicate in detail, at this time, mechanism interconnecting such a motor with a cash register. It will only be recalled that such use of a motor is referred to in the specification of the Gubelman patent hereinbefore referred to (although not shown in his drawing) and that Gubelman stated that such a motor may run continuously and its power be applied through a single-cycle clutch or (as is most frequently the case in widely used cash registers) the motor may be started responsive to each depression of the starting bar of the cash register and automatically stopped at the end of the resultant cycle.

A single-cycle motor and clutch control mechanism 219 is schematically shown. Such mechanism is arranged for actuation of the cash register through suitable interconnecting structure (not shown). Said mechanism 219 is more fully shown and described in the copending application of C. E. Beach, filed May 11, 1951, Serial No. 225,711, to which reference is had.

The mechanism 219 is governed by the solenoid 221 in a manner such that a single cycle of the operation of the cash register will result from each energization of said solenoid, independently of the duration of such energization.

It should be understood that the stem M45 which governs said mechanism 219 functionally corresponds with the stems actuated by starting bars provided for initiating operative cycles of well-known forms of cash registers.

Contacts 212 are governed by a cam 214, which cam rotates with a shaft G37 (which shaft also carries the cam G587, cooperating with one or more dogs G603). This shaft makes one revolution incident to each cycle of cash register operation.

The formation of the cam 214 is such that, when said cam G587 is in its home position (as shown), the contacts 212 stand closed, and said cam causes separation of these contacts incident to, and in the latter portion of each revolution of the shaft G37.

The cash register CR shown in Fig. 1 is not provided with any manually operable keyboard. Instead, there are columns of mechanisms within the casing b, such as shown in Fig. 7. Each of said mechanisms includes a solenoid 216 for imparting movement to an associated stem 218. Such stems are analogous to the stems of the amount keys shown in the aforesaid Gubelman patent, being correspondingly supported by main channel members G46 and cooperating with latching and locking bars G52 and releasing slides G62 (which bars and slides pass through the stem openings G51), together with all other mechanism and structure whereby actuation of any stem 218 (as occurs resultant from excitation of the associated solenoid 216) will condition the cash register so that, during an operative cycle resultant from next energization of the solenoid 221, it will effect recordal and/or display of a numeral representative of the stem which has been so set, as well as entry in various totalizers of the amount represented by all stems then actuated.

In using structural characteristics such as thus far herein described, it will be evident that the speed of rotation of the rotors 103 should be slow enough to assure effective energizations of the solenoids 216 responsive to current flow occurring during the very limited portions of rotation cycles while any rotor brush 109 connects with one or another of the associated contacts.

In order to permit a desirably rapid speed of the rotation of said brushes, as well as for the purpose of minimizing arcing at controlling contacts such as the pens 121, 123, 125 and 127, as well as at the brushes 109, quick-pickup and slow-release relays should be interposed between said contacts and said solenoids; and/or direct current should be utilized for solenoid energization, and condensers should be connected in parallel with respective ones of said solenoids, such as the condensers 217 shown in association with certain of the right hand ones of the solenoids 216 of Fig. 7.

Inasmuch as the manner of utilizing such relays and/or condensers is well understood by those skilled in this art, and in order to avoid needlessly complicating the drawings, none of such relays and only a limited (but representative) number of such condensers are shown.

It should also be understood that columns of solenoids 216 and stems 218 are provided for each order of figures (e. g. cents, dimes, dollars), as well as for departmental designations. In the interests of simplicity and clearness, but four units comprising such solenoids and stems are shown as representing the ten such units which should be provided for the column representing units of cents, but three such units are shown for tens of cents, and but two such units for dollars. As previously herein stated, if there is occasion for departmental designations, another column comprising a suitable number of such units (here represented by one unit) should be provided for these designations.

Certain widely used cash registers are equipped with interlocking mechanism for preventing setting of amount keys until some departmental key has been set. Inasmuch as setting impulses for departmental designations and amounts are concurrently formulated by mechanism arranged in accordance with Fig. 7, it is evident that the amount stems and departmental stems such as those of Fig. 7 should not be here so interlocked.

Reference has been hereinbefore made to token indicia supplemental to that representative of price-amount and departmental designations. It should be understood that additional mechanism of various types may be provided for sensing such supplemental indicia; and that such sensing may be accomplished incidentally or supplementally to processing of the price and departmental indicia designations, or could be later effected by another machine; and that sensing of such supplemental indicia might be utilized for causing the register to effect subdivisional totalizing or grouping of sums of data, transactions, perpetual inventory maintenance or other useful groupings of such indicia data or for sorting tokens in various classifications after sensing, either by a token analyzer embodying this invention or by use of mechanism supplemental hereto such as has been heretofore provided in tabulating and sorting machines.

Thus if the lock 149 (Fig. 8) is set by a suitable key in positioning for ascertainment of departmental or grand totals, and the key 141 is pressed, contacts such as 161 (Fig. 7) will be closed, thereby to cause energization of a solenoid such as 216 for effecting actuation of a stem such as 218, thereby to effect a setting of the register, corresponding to that which would result from pressing the "Groceries" key of well-known types of cash registers heretofore in general use.

Subsequent pressing of the transaction total key 87 and of the starting bar 81 will cause printing and display of the sum of the entries in the "groceries" totalizer, and the clearing of that totalizer.

If instead of such use of the transaction total key 87, the sub-total key 85 is operated, the corresponding sum will be similarly recorded and displayed, but the "groceries" totalizer will not be cleared.

Similar results can be obtained by use of the key 143 for ascertaining "Produce" totals, of the key 145 for "Meat" totals, and of the key 147 for the so-called "Grand" total.

The keys 148, 148 may be utilized for correspondingly ascertaining sums of transactions affecting one or another of the cashiers.

The arrangement and controlling mechanism for the cash drawers 139, 139 may be as in one or another of various well-known types of manually operated cash registers.

It should be understood that structure may be provided in the cash register CR, as may be needed, for accomplishing results obtained by usual cash register transaction counters, cashier's locks, resetting control, type carriers, and for other purposes. Inasmuch as such structures form no part of this invention, they are neither herein described in detail nor shown in the accompanying drawings.

From the foregoing it will be evident that the analyzer TA comprises means for scanning tokens which have been submitted through the magazine 61 for processing thereby; and, incidental to such processing, for initiating electrical impulses suited for causing the associated cash register mechanism CR to determine, record, display and introduce or enter into what might be termed a "grand totalizer," and/or into what are termed "cashier's totalizers," as well as in departmental or other special totalizers, the price represented by the indicia of any independently processed token, or the sum of the prices represented by the indicia of the tokens of any series which are consecutively analyzed in a processing cycle initiated by actuation of the starting bar 81.

*Current paths, Fig. 7*

A current path is established by closure of the main switch MS, through conductors 201 and 203, for supplying operating current to the motor B25.

Assuming that the various parts are in their home positions when the main switch MS is closed, the relay contacts 155 and 157 and the starting contacts 161 will be open; hence, the magnet 151 will be de-energized. The brushes 109 of rotors 103 will not be touching any of the contacts of the selectors 105 with which they may cooperate, and the register starting contacts 111 will be open. Hence, all of the analyzer current paths will be open, except that which supplies the motor B25.

The single-cycle clutch mechanism which is driven by the motor B25 and governs the actuation of the analyzer mechanism, will be positioned as indicated in Fig. 12.

There will be no current flow through branch conductors 201' and 203' pending initiation of actuation of the register mechanism; but, incident to such register operation, other initially open current paths will be established, as will be hereinafter more fully explained.

Upon actuation of the starting bar 81, the contacts 161 will be closed, thus establishing a current path from supply conductor 201, through contacts 165 (which are assumed to be closed because of the presence of tokens in the magazine 61, and being surmounted by the weight 65) thence through conductor 202 and magnet 151, contacts 163, and contacts 161 to supply conductor 203.

Closure of the current path just described will cause energization of the magnet 151 and resultant movement of the armature lever 153 to attracted position, thereby to close contacts 155 and 157.

Such closure of contacts 155 will establish a lockup current path around the starting contacts 161.

Closure of the contacts 157 will result in energization of magnet B403, through current path from supply conductors 201 and 201', contacts 212, conductor 207, magnet B403, conductor 209, contacts 157, and thence to supply conductor 203.

Such energization of the magnet B403, will result in movement of the armature lever 91 to attracted position. Such movement of armature lever 91, acting through drag bar 93 and pin 95, will withdraw latch B404' from the path of the projection 115 of the disk B402, and, at the same time, will permit the dog B401 to engage the notch in the clutch element B400, with resultant rotation of the gear B397, the shaft B30, the rotors 103 of the selectors 105, and the cam 107 and disk B33.

During such rotation of the shaft B30, the brushes 109 of the various selectors 105 will consecutively touch their associated contacts, in step with the movement across the roller B46 of the token 21 then being sensed; so that, in a manner analogous to that of widely known sensing mechanisms, current paths will be established as openings in the token pass under respectively associated brushes.

As shown, the pen 123 is permitted to pass through an opening in the token 21 and thereby establish a connection with the roller B46 for effecting energization of the one of the solenoids 216 which represents the value of 20¢. The current path thus established being from supply conductor 201, through brush 129, roller B46 and pen 123, through conductor 204, thence through brush 109 and contact of selector 105 representative of 20¢, through conductor 211 and through solenoid 216 in next to the lowest value position in the dimes column, to supply conductor 203'.

The rotation of cam 107 with shaft B30, as just referred to, will cause momentary closure of the contacts 111 just before the termination of a cycle of such rotation. Closure of these contacts 111 will establish a current path from supply conductor 201, through said contacts 111, solenoid 221, and conductor 203', to supply conductor 203.

Resultant energization of solenoid 221 will cause a cycle of operation of the cash register CR, in the course of which cycle the settings of the stems 218 representing the amount expressed by the indicia of the token 21 just scanned by the analyzer TA will be entered in a desired one or more of the departmental totalizers, as determined by the presetting of a stem 218 responsive to connection of the pen 127 with the roller B46, through an opening in said token in alinement with said pen.

During the rotation of the shaft G37, incident to the operating cycle of the cash register CR, the contacts 212 will be separated, thereby causing de-energization of the magnet B403, with resultant movement of the lever 91 to its retracted position, whereupon the drag bar 93 will be positioned for re-engaging the pin 95.

Before the shaft G37 comes to rest, the amount and departmental stems 218, which were in set positions at the commencement of the cycle, will have been returned to their unset positionings as, for example, in a manner such as that more fully described in the aforesaid Gubelman patent; and, at the time of such return, or shortly thereafter, and just before the shaft G37 comes to rest at the conclusion of the cycle, the cam 214 will permit the contacts 212 to close, with resultant re-energization of the magnet B403.

In response to such re-energization, the latch B404' will be withdrawn, and another cycle of operation of the analyzer TA and of the cash register CR will thereupon be initiated; all provided there is another token in the magazine 61.

Upon withdrawal of the last token from the magazine 61, the contacts 165 will separate, with resultant de-energization of the magnet 151 of relay 150, and consequent separation of contacts 155 and 157.

Such separation of contacts 157 will prevent reenergization of the magnet B403 when the contacts 212 close at the conclusion of the concurrent operating cycle of the cash register CR.

Such separation of the contacts 155 will prevent re-energization of the magnet 151, when tokens are next placed in the magazine 61, pending such time as the starting bar 81 is again depressed.

Should it be desired to interrupt the cycles of operation of the analyzer and register of Fig. 7 before all of the tokens have been withdrawn from the magazine 61, actuation of the stopping key 83 will cause separation of contacts 163 with resultant de-energization of the magnet 151 and consequent opening of the contacts 155 and 157 of the relay 150.

After any such interruption, activity may be again initiated by operation of the starting bar 81.

Slotted tokens

For reasons known to persons accustomed to utilization of record cards of types heretofore used in tabulating and sorting machines, it has been found to be expedient that such cards shall not be exposed to handling or use under circumstances such as are likely to result in absorption of any considerable amount of moisture or in deformations either of surfaces or edges of the cards; and attainment of accuracy has been very largely dependent upon avoidance of unintended perforations.

When embodiments of this invention are used in circumstances such that tokens will be subject to handling by stock-men and clerks, and by customers who might hope to financially benefit through mutilation of such tokens, results more dependable than those obtainable through use of tokens of the Hollerith type will be afforded by use of tokens of the general type indicated in Figs. 9 and 10. For convenience, tokens of such type will, at times, be herein referred to as "slotted tokens;" as distinguished from punched tokens of the general Hollerith type.

Tokens which are so slotted are shown and described in a co-pending application of C. E. Beach and Wm. P. Munger, filed March 14, 1950, Serial No. 149,542, to which reference is had.

Tokens of the general type illustratively shown in Figs. 9 and 10 utilize price expressing slots, such as $t2^1 \ldots t2^4$.

For example, the slots $t2^1$ and $t2^2$ of the token of Fig. 9, and the slot $t2^{2'}$ of Fig. 10, do not extend beyond the area designating zero ("0"); thus indicating absence of dollars in the represented price. The slots $t2^3$ and $t2^{3'}$ of these tokens extend through and beyond said zero area into the area designating 30 cents, and the slots $t2^4$ and $t2^{4'}$ extend through and beyond said zero area into the area designating 7 cents; 37 cents being the price of the merchandise unit represented by this token.

As illustratively shown in Fig. 10, supplemental slottings may be provided as, for example, for expressing data other than that which is price-expressing; inclusive of departmental designations, freshness control, and specific identification of merchandise units.

Thus, in the instance of Fig. 10, the slottings $t2^{2'}$, $t2^{3'}$ and $t2^{4'}$ express price data of a character corresponding to that expressed by punchings in the field $t2$ of the token of Fig. 6; while the slot $t4'$ identifies the department, as in the instance of the field $t4$ of Fig. 6; and the slots $t8'$ and $t8''$ may be utilized for identifying the particular merchandise unit with which the token is to be associated, as in the instance of the field $t8$ of Fig. 6. Correspondingly, slots such as $t8'$ and $t8''$ of the token of Fig. 10 could be used in conformity with a code whereby, when considered with reference to the slot $t4'$, such slots would designate a one pound unit of peanut butter of a particular brand, which unit is also described in the legend printed in the field $t10'$.

Similarly, supplemental slots (exemplified by $t8'$ and $t8''$) may be utilized for expressing a freshness control code similar to that expressed in the field $t6$ of Fig. 6.

It should be understood that the various slots may extend greater or less distances, and that they should end in areas which are representative of preselected indicia numerals or other symbols.

When slotted tokens such as thus far described are scanned by analyzing mechanism such as that indicated in Fig. 11, and hereinafter described in greater detail (which analyzing mechanism is more fully shown and described in the aforesaid Beach and Munger application, Serial No. 149,542), it will be evident that the dependability of the scanning or sensing of such tokens will not be impaired, even though there are substantial variations in distances which such slots extend away from the zero areas of such tokens, or because of comparatively extensive deviations from ideal placement of such tokens during scanning thereof by the sensing mechanism.

For example, in the sensing of the slot $t2^3$ of a token such as that of Fig. 9, the contacts $681^3$ (see Fig. 11) will be closed (and thereby cause energization of the solenoid 216 which is representative of 30¢ (".30") if the bolt 317' is caused to descend early enough (in the course of the rearward movement of its associated slide) so that said bolt will engage the vertical face of the bar 393, but not early enough to pass to right of the bar 392. In other words, there can be substantial variation in the positioning of the end of any slot, with relation to its associated feeler 315, without impairing the dependability of scaning results, so long as such variation is not as great as the distance from one to another of rack bars 390 . . . 399.

Fig. 11 mechanism

Best results in the use of slotted tokens, of the type shown in Figs. 9 and 10, will be obtained by utilization of one form or another of sensing mechanism such as that schematically shown, partly in diagrammatic form, in Fig. 11, in the place of the analyzer mechanism correspondingly shown in Fig. 7.

Inasmuch as many of the detailed features of such mechanism form no part of the invention herein claimed, but are claimed, shown and fully described in the aforesaid copending Beach and Munger application, Serial No. 149,542 (to which reference is had), such details are only schematically shown in the accompanying drawings and will be hereinafter described only to an extent such as is desirable for indicating a representative method for utilizing mechanism such as that disclosed by said application pursuant to the present invention.

Certain of the parts schematically indicated in the left hand portion of Fig. 11 are here identified by reference characters corresponding to those used in the aforesaid copending Beach and Munger application for identifying analogous parts; in some instances such characters are here prefixed by the letters BM. Other parts are identified by reference characters corresponding either to those used in Fig. 7 hereof or to those used in the Buhler patent hereinbefore referred to, in the latter instance being prefixed by the letter B.

The motor B25 acts to continuously drive the clutch element B400', and acts through this element upon associated parts in a manner corresponding to that hereinbefore explained with reference to the clutch member B400 and associated parts of Fig. 7; except that the clutch element B400' is here indicated as rotating clockwise, while that of the corresponding member B400 of Fig. 7 is there indicated as rotating counterclockwise.

Rotation imparted to the gear B397' acts through suitable intervening mechanism (not shown), to cause rotation of the shaft BM93, which shaft carries a cam BM137 for actuating an impeller plate BM101 (through suitable intervening mechanism not here shown) for picking tokens T4 from the magazine BM21.

The cam 107' also rotates with the shaft BM93 and controls the contacts 111'; for governing the registering mechanism, as more fully explained with reference to the contacts 111 of Fig. 7.

A token T4 is shown in sensing position, with associated feeler blades BM33, BM35, BM37 and BM41 in the positions in which they would be brought by their associated slides when they come to rest in the course of scanning the token T4.

Resultant from positioning of the blades BM33, BM35, BM37 and BM41, as just referred to, the bolts 317' respectively associated with said blades will be brought into engagement with appropriate ones of the bars 390 . . . 399.

Thus the bolt 317' which is associated with the feeler BM41 will be in engagement with the bar 391 associated therewith, as shown in the drawing, where it causes a suitable one of the actuating bars 683 to close the contact 681$^1$ responsive thereto. The bolt 317' associated with the feeler BM33 engages the bar 390. However, if the position thus represented is that of zero, it does not cause closure of any of the associated contacts.

The bolt 317' associated with the feeler BM35 is shown engaging the bar 393 and thus acting through an appropriate one of the bars 683 to close the contacts 681$^3$; and the bolt 317' associated with the feeler BM37 engages the bar 398 and moves an appropriate one of the bars 683 to close the contacts 681$^7$ associated therewith.

Such closure of the contacts 681$^1$ responsive to the feeler BM41 causes energization of the solenoid 216 which is representative of groceries ("G"); and closure of the contacts 681$^3$ associated with the feeler BM35 causes energization of the solenoid 216 representative of 30¢, and closure of the contacts 681$^7$ causes energization of the solenoid 216 representative of 7¢ (which solenoid is not shown) with results such as those set forth with reference to energization of corresponding solenoids in the foregoing description of Fig. 7; for the purpose of effecting a conditioning of the cash register so that, during the operative cycle resultant from the next energization of the solenoid 221, such register will effect recording and/or display of a symbol and numerals representative of the stems which have been thus set, as well as entry of the amount represented by such price stems as have been actuated in suitable ones of the totalizers, as determined by which of the departmental stems has been actuated.

It will be noted that the problems of operating speed and need for quick-pickup and slow-release relays and/or condensers in parallel with solenoids, as referred to in the foregoing description of Fig. 7, are not present in an embodiment of this invention such as shown by Fig. 11.

Furthermore, it will be evident that even though the cash register mechanism is equipped with interlocking mechanism for preventing the setting of amount keys until some departmental key has been actuated, it will not be objectionable in a register controlled as shown by Fig. 11; because the energization of the solenoids for the amount-stems will continue for a time sufficiently long to give opportunity for actuation of amount-stems following completion of actuation of a department representing stem.

It is believed that the foregoing explanation, in the light of the description of the embodiment of Fig. 7, will enable the embodiment of this invention shown in Fig. 11 to be sufficiently understood without further description.

Current paths, Fig. 11

Closure of the contacts 681$^1$ associated with the feeler BM41 establishes a current path from conductor 201, through said contacts 681$^1$, through conductor 691 and the associated solenoid 216, to conductor 203. Closure of contacts 681$^3$ associated with feeler BM35, and closure of contacts 681$^7$ associated with feeler BM37 will establish current paths through conductors 695 and 697, respectively, to appropriate solenoids.

The other current paths of Fig. 11 sufficiently correspond with those of Fig. 7, so that the description thereof need not be repeated.

Combination token and finger key control

Where conditions of use are such that provision of so-called "finger keys" is desirable for handling some transactions (as, for example, when utilized in certain perpetual inventory schemes) embodiments of this invention such as illustratively shown in Figs. 14 and 15 can be advantageously used.

Description of Fig. 14

The cash register CR' of Fig. 14 contains equipment analogous to that shown by the right hand portions of Figs. 7 and 11, which equipment is supplemented as follows:

Transfer handle 701 is provided for alternatively conditioning the register CR' for operation responsive to the analyzer TA' or to finger keys provided on said register.

Cashier designating keys 148' are provided (in place of or supplemental to corresponding keys of the token analyzer TA as shown in Fig. 8) and a suitable number of columns of amount finger keys 721 are provided for manual actuation. Although but five columns of such keys are here shown, it will be understood by those skilled in the art that such a larger or smaller number of columns may be provided as is needful for meeting service conditions.

A suitable group of finger keys 140$^3$ is provided (here shown as three keys) either in place of or supplemental to corresponding keys 141, 143 and 145, on the token analyzer TA of Fig. 8.

A bar 83' is provided for conditioning the register with reference to taking of totals, and there is a starting bar 81'. These may be in place of or supplemental to corresponding parts shown in Fig. 8.

Description of Fig. 15

The structure provided in the cash register CR' of Fig. 14 may include either that illustratively shown in Fig. 7 or that so shown in Fig. 11, or other correspondingly suited mechanism. Any such cash register mechanism should be supplemented by the equipment shown in Fig. 15, for alternatively conditioning the cash register mechanism for response to the scanning mechanism of the token analyzer TA' or to the usual cash register keys, such as shown in Fig. 14.

Inasmuch as the actuating mechanism for all of the various stems 218 is substantially identical, such mechanism will be shown in Fig. 15 for but an exemplary one of such stems.

Each stem 218 has openings such as G51 and G54 formed therein, and slides through suitable openings in a channel member G46, and interacts with a latching and locking bar G52 and a releasing slide G62 all as hereinbefore more fully explained.

A core 216' slides freely in the solenoid 216, for depressing the stem 218; a spring G47 being provided for lifting the stem 218, as more fully explained in the aforesaid Gubelman patent.

A finger key stem 731 slides freely through openings in the frame plates 733 and 735; the usual finger key 737 being provided on the upper end of the stem 731.

The lower end of the stem 731 rests upon the upper end of the core 216', and a fin 739 is carried by and projects to the right of the stem 731 (as viewed in Fig. 15) which fin passes through the frame plate 735, while the upward travel of said fin is blocked by the plate 733.

A transfer lever 701', pivoted at 703, acts through the link 705 to impart horizontal movement to a locking plate 741, which plate is pivoted to the free ends of the arms 743, 743.

The plate 741 has an opening 745 through which the stem 731 passes, said opening 745 being elongated so that when the plate 741 is in its extreme right hand position the opening 745 will permit the fin 739 to pass therethrough; but so that when said plate is in its left hand position, said fin 739 will be locked thereby to prevent depressed positioning of the stem 731.

A flat spring 711 may be provided for cooperation with a lug 713 carried by the link 705, for stabilizing the lever 701' and the plate 741 in their respective extreme positions; or a similar lug may be provided elsewhere, and arranged to move with the plate 741 for effecting similar stabilization.

A latch 751, pivoted at 753 has an end 755 thereof which is held in engagement with the upper surface of the core 216' by the spring 757.

A block 759 carried by the plate 741 is so positioned that, when the latch 751 is in the position it occupies when the core 216' is in its depressed position, the end 755' of the latch 751 will be disposed in the path of said block 759, and thereby prevent movement of the handle 701 and the plate 741 from extreme right hand positioning.

Contacts 761 are associated with the lever 701' so that these contacts will be closed only when said lever is in or near its extreme left hand position.

The contacts 761 are serially included in the current path between supply conductor 203 and contacts 155, 157 and 161, to the end that energization of the relay 150 cannot be either initiated or continued when the contacts 761 are open.

An electromagnet 771 is connected in parallel with the relay magnet 151, and an armature lever 773, responsive to said magnet 771, is so formed and positioned that, when said magnet is energized while the handle 701 of the lever 701' is in its left hand position, the lever 773 will pass to the left of the lower end of said lever 701' and thereby prevent transfer of the handle 701 from its left hand to its right hand positioning.

*Operation of Figs. 14 and 15*

During use of the analyzer TA', as hereinbefore described, the handle 701 should be in its left hand position.

While the handle 701 is thus positioned, closure of the contacts 761 will cause energization of the magnet 771 (as well as of the relay magnet 151) thereby to cause the lever 773 to be positioned for blocking movement of the handle 701 from its left hand to its right hand positioning.

Scanning of tokens and appropriate response of the register mechanism CR' may then proceed, as hereinbefore more fully described, throughout energization of the magnet 151 of the relay 150; that is, as long as there are tokens to be scanned in the magazine, or until scanning activities are suspended through separation of the contacts 163.

During scanning of tokens and incidental left hand positioning of the handle 701, as just described, the plate 741 is positioned in the path of the fins 739 of all of the cash register finger keys, so that response to the scanning of tokens cannot be confused or interfered with by accidental or malicious operation of the finger keys.

De-energization of the relay magnet 151, will be accompanied by de-energization of the magnet 771, whereupon spring 775 will withdraw the lever 773 from the path of the lower end of the lever 701'.

When, during de-energization of the magnet 771, there is occasion for causing actuation of the cash register mechanism responsive to its associated finger keys (instead of responsive to the token analyzer TA') the handle 701 should be swung to its right hand position, thereby to withdraw the plate 741 from the paths of the fins 739 of the various finger key stems 731.

Such movement of the handle 701 will effect separation of the contacts 761, thereby interrupting current supply from the conductor 203 to relay magnet 151, to thereby prevent operation of the analyzer TA'.

The various finger keys and other parts may then be operated, as in course of ordinary cash register use.

When any stem 218 is depressed, incident to such use, its support is withdrawn from the end 755 of the latch 751, and such latch is then swung by its spring 757 so as to bring its end 755' into the path of the associated block 759 carried by the plate 741; thereby to prevent movement of the handle 701 to its left hand positioning so long as any one or more of the stems 218 is in depressed position.

Because of such action of the latches 751 associated with the various finger keys, it will be evident that if any one or more of such keys is or are depressed, and the cash register has not acted to display and enter the indicated price or departmental data, the analyzer mechanism TA' cannot be set into action until such key actuations have been responded to by the cash register or have been cancelled by the use of the usual "elimination" or "release" keys.

From the foregoing, it will be evident that various embodiments of this invention provide for accomplishment of results such as heretofore attained by actuation of finger keys of cash registers, with resultant opportunities for accidental or malicious miss-keying; and that such accomplishment is dependably and expeditiously attained.

While we have shown and described in considerable detail certain specific embodiments of this invention, it should be understood that such embodiments have been selected merely as illustrative and for the purpose of making clear the nature and objects of this invention, and that we do not regard this invention as limited to these details, nor to any of them, except in-so-far as such limitations are included within the terms of the following claims, in which it is intended to claim all novelty inherent to this invention as broadly as is permissible in view of the prior art.

It should also be understood that the language used in the following claims is intended to define all of the generic and specific features of the invention herein described and all statements of the scope of this invention, which, as a matter of language, might be said to fall therebetween.

Having thus described our invention, what we claim as new, and desire to secure by Letters Patent of the United States of America is:

1. In a device of the class described, the combination of mechanism suited for cyclically acting to individually scan indicia of tokens of an intended type thereby to ascertain both price and accounting classifications characterizing one or another of a variety of merchandise units, a magazine having walls between which such tokens may be stacked in preparation for such scanning, parts operable for initiating cycles of the action of said mechanism, said parts involving a feeler movable upwardly to position a portion thereof in that part of said magazine which may be occupied by the bottom token of such a stack, means yieldingly urging such upward feeler movement, a weight suited for applying to the upper surface of a token so positioned pressure sufficient to cause downward movement of said feeler notwithstanding such urge whereby to permit aforesaid cycle initiations, said weight having a projection extending from a surface thereof which projection extends into a slot formed in a wall of said magazine for movably securing the weight against removal from the magazine, the upper portion of which slot of form and positioning suiting a wall of said slot for serving, at times, to effect retention of said weight in elevated positioning, a cyclically acting register mechanism comprising a plurality of totalizer mechanisms suited for independent alternative operation, means responsive to said scanning mechanism for selectively rendering one or another of said totalizers responsive to said first named mechanism in accordance with accounting classification indicia of scanned tokens, cyclic-action initiating means for said register mechanism, means for effecting actuations of said last named cycle initiating means only after completions of scanning cycles of said scanning mechanism and only during upward positionings of said feeler, and means rendered effective incident to completions of operation cycles of said register mechanism for operating the aforesaid parts for effecting initiations of individual cycles of the action of said scanning mechanism and for preventing initiation of scanning mechanism cycles during register operation cycles.

2. In a device of the class described, the combination of mechanism suited for cyclically acting to individually scan indicia of tokens of an intended type thereby to ascertain both price and accounting classifications characterizing one or another of a variety of merchandise units, a magazine having walls between which such tokens may be stacked in preparation for such scanning, parts operable for initiating cycles of the action of said mechanism, said parts involving a feeler movable upwardly to position a portion thereof in that part of said magazine which may be occupied by the bottom token of such a stack, means yieldingly urging such upward feeler movement, a weight suited for applying to the upper surface of a token so positioned pressure sufficient to cause downward movement of said feeler notwithstanding such urge whereby to permit aforesaid cycle initiations, said weight having a projection extending from a surface thereof which projection extends into a slot formed in a wall of said magazine for movably securing the weight against removal from the magazine, upper portions of which slot and of a wall of said magazine of forms and positionings suiting them for cooperation for serving, at times, to effect retention of said weight in elevated positioning, cyclically acting register mechanism comprising a plurality of totalizer mechanisms suited for independent alternative operation, means responsive to said scanning mechanism for selectively rendering one or another of said totalizers responsive to said first named mechanism in accordance with accounting classification indicia of scanned tokens, cyclic-action initiating means for said register mechanism, means for effecting actuations of said last named cycle initiating means only after completions of scanning cycles of said scanning mechanism and only during upward positionings of said feeler, and means rendered effective incident to completions of operation cycles of said register mechanism for operating the aforesaid parts for effecting initiations of individual cycles of the action of said scanning mechanism and for preventing initiation of scanning mechanism cycles during register operation cycles.

3. In a device of the class described, the combination of mechanism suited for cyclically acting to individually scan indicia of tokens of an intended type thereby to ascertain both price and accounting classification characterizing one or another of a variety of merchandise units, a magazine having walls between which such tokens may be stacked in preparation for such scanning, parts operable for initiating cycles of the action of said mechanism, said parts involving a feeler movable upwardly to position a portion thereof in that part of said magazine which may be occupied by the bottom token of such a stack, means yieldingly urging such upward feeler movement, a weight suited for applying to the upper surface of a token so positioned pressure sufficient to cause downward movement of said feeler notwithstanding such urge whereby to permit aforesaid cycle initiations, the lower surface of said weight having a recess therein for receiving said feeler during upward positioning thereof, said weight further having a projection extending from a surface thereof which projection extends into a slot formed in a wall of said magazine for movably securing the weight against removal from the magazine, the upper portion of which slot of form and positioning suiting a wall of said slot for serving, at times, to effect retention of said weight in elevated positioning, cyclically acting register mechanism comprising a plurality of totalizer mechanisms suited for independent alternative operation, means responsive to said scanning mechanism for selectively rendering one or another of said totalizers responsive to said first named mechanism in accordance with accounting classification indicia of scanned tokens, cyclic-action initiating means for said register mechanism, means for effecting actuations of said last named cycle initiating means only after completions of scanning cycles of said scanning mechanism and only during upward positionings of said feeler, and means rendered effective incident to completions of operation cycles of said register mechanism for operating the aforesaid parts for effecting initiations of individual cycles of the action of said scanning mechanism and for preventing initiation of scanning mechanism cycles during register operation cycles.

4. In a device of the class described, the combination of mechanism suited for cyclically acting to individually scan indicia of tokens of an intended type thereby to ascertain both price and accounting classifications characterizing one or another of a variety of merchandise units, a magazine having walls between which such tokens may be stacked in preparation for such scanning, parts operable for initiating cycles of the action of said mechanism, said parts involving a feeler movable upwardly to position a portion thereof in that part of said magazine which may be occupied by the bottom token of such a stack, means yieldingly urging such upward feeler movement, a weight suited for applying to the upper surface of a token so positioned pressure sufficient to cause downward movement of said feeler notwithstanding such urge whereby to permit aforesaid cycle initiations, the lower surface of said weight having a recess therein for receiving said feeler during upward positioning thereof, said weight further having a projection extending from a surface thereof which projection extends into a slot formed in a wall of said magazine for movably securing the weight against removal from the magazine, upper portions of which slot and of a wall of said magazine of forms and positionings suiting them for cooperation for serving, at times, to effect retention of said weight in elevated positioning, cyclically acting register mechanism comprising a plurality of totalizer mechanisms suited for independent alternative operation, means responsive to said scanning mechanism for selectively rendering one or another of said totalizers responsive to said first named mechanism in accordance with accounting classification indicia of scanned tokens, cyclic-action initiating means for said register mechanism, means for effecting actuations of said last named cycle initiating means only after completions of scanning cycles of said scanning mechanism and only during upward positionings of said feeler, and means rendered effective incident to completions of operation cycles of said register mechanism for operating the aforesaid parts for effecting initiations of individual cycles of the action of said scanning mechanism and for preventing initiation of scanning mechanism cycles during register operation cycles.

5. In a device for ascertaining classified summations of data expressed by tokens each of which has indicia representative of some one or another of diverse price amounts, the combination of a magazine in which tokens of such type may be stacked, analyzer mechanism including driving means for effecting cyclic actuations thereof, means for singly initiating such actuation cycles, said analyzer mechanism including sensing mechanism suited for acting to scan indicia of respective tokens, one token incident to each actuation cycle, register mechanism, means for singly initiating actuation cycles of said register mechanism thereby to effect entry of the price expressed by the indicia of a concurrently scanned token, activating mechanism for said initiating means including structure associated for activation by said analyzer mechanism only after respective completions of cyclic actuations thereof, and means rendered effective incident to completions of operation cycles of said register mechanism for operating the aforesaid means for effecting initiations of individual cycles of the action of said analyzer mechanism and for preventing initiation of scanning mechanism cycles during register operation cycles.

6. In a device for ascertaining classified summations of data expressed by tokens each of which has indicia representative of some one or another of diverse price amounts, the combination of a magazine in which tokens of such type may be stacked, analyzer mechanism including driving means for effecting cyclic actuations thereof, means for singly initiating such actuation cycles, said analyzer mechanism including sensing mechanism suited for acting to scan indicia of respective tokens so picked, one token incident to each actuation cycle, register mechanism, means for singly initiating actuation cycles of said register mechanism thereby to effect entry of the price expressed by the indicia of a concurrently scanned token, activating mechanism for said initiating means including structure associated for activation by said analyzer mechanism only after respective completions of cyclic actuations thereof, thereby to prevent initiation of register mechanism cycles of operation during scanning cycles of said analyzing mechanism, and means rendered effective incident to completions of operation cycles of said register mechanism for operating the aforesaid means for effecting initiations of individual cycles of the action of said analyzer mechanism and for preventing initiation of scanning mechanism cycles during register operation cycles.

7. In a device for ascertaining classified summations of data expressed by tokens each of which has indicia representative of some one or another of diverse price amounts, the combination of a magazine in which tokens of such type may be stacked, analyzer mechanism including driving means for effecting cyclic actuations thereof, means for singly initiating such actuation cycles, said analyzer mechanism including sensing mechanism suited for acting to pick tokens from said magazine, one token incident to each actuation cycle, and to scan indicia of respective tokens so picked, register mechanism, means for singly initiating actuation cycles of said register mechanism thereby to effect entry of the price expressed by the indicia of a concurrently scanned token, activating mechanism for said initiating means including structure associated for activation by said analyzer mechanism only after respective completions of cyclic actuations thereof, thereby to prevent initiation of register mechanism cycles of operation during scanning cycles of said analyzing mechanism, and means rendered effective incident to completions of operations cycles of said register mechanism for operating the aforesaid means for effecting initiations of individual cycles of the action of said analyzer mechanism and for preventing initiation of scanning mechanism cycles during register operation cycles.

8. In a device for ascertaining classified summations of data expressed by tokens each of which has indicia representative of some one or another of diverse price amounts and of one or another of certain alternative accounting classifications, the combination of a magazine in which tokens of such type may be stacked, analyzer mechanism including driving means for effecting cyclic actuations thereof, means for singly initiating such actuation cycles, said analyzer mechanism including sensing mechanism suited for acting to pick tokens from said magazine, one token incident to each actuation cycle, and to scan indicia of respective tokens so picked, register mechanism comprising a plurality of totalizers suited for independent alternative operation, parts responsive to the scanning actions of said analyzer mechanism for selectively rendering one or another of said totalizers responsive to price indicia of respective scanned tokens in accordance with the associated accounting classification, means for singly initiating actuation cycles of said register mechanism thereby to effect entry of the price expressed by the indicia of a concurrently scanned token in a totalizer representative of the accounting classification represented by the indicia of such token, activating mechanism for said initiating means including structure associated for activation by said analyzer mechanism only after respective completions of cyclic actuations thereof, thereby to prevent initiation of register mechanism cycles of operation during scanning cycles of said analyzing mechanism, and means rendered effective incident to completions of operation cycles of said register mechanism for operating the aforesaid means for effecting initiations of individual cycles of the action of said analyzer mechanism and for preventing initiation of scanning mechanism cycles during register operation cycles.

9. In a device for ascertaining classified summations of data expressed by tokens each having indicia expressive of a price amount and an accounting classification representative of some one or another of said units, in combination with a magazine in which groups of such tokens which are collectively representative of individual sales transactions may be stacked, analyzer mechanism including driving means for effecting cyclic actuations thereof, means for singly initiating such actuation cycles, said analyzer mechanism including sensing mechanism suited for acting to pick tokens from said magazine, one token incident to each actuation cycle, and to scan indicia of respective tokens so picked, parts operable for initiating cycles of the action of said sensing mechanism, means suited for acting in response to individual actuations of said parts for effecting sequential scanning of the indicia of each of all of the tokens of any group so presented both as to price amounts and as to the accounting classifications expressed thereby, register mechanism comprising a plurality of totalizers suited for independent alternative operation, means responsive to said analyzer mechanism for effecting settings of one or another of certain of said totalizers selectively responsive to said analyzer mechanism in accordance with accounting classification indicia of scanned tokens and for concurrently effecting setting of another of said totalizers for ascertaining the sum of the price indicia of all tokens of each transaction group so scanned, means for singly initiating actuation cycles of said register mechanism thereby to effect entry of the price expressed by the indicia of a concurrently scanned token in a totalizer representative of the accounting classification represented by the indicia of such token and in a transaction totalizer, activating mechanism for said initiating means inclusive of structure associated for activation by said analyzer mechanism only after respective completions of cyclic actuations thereof, thereby to prevent initiation of register mechanism cycles of operation during scanning cycles of said analyzer mechanism, means rendered effective incident to completions of operation cycles of said register mechanism for operating the aforesaid means for effecting initiations of individual cycles of the action of said analyzer mechanism and for preventing initiation of such cycles during register operation cycles, and mechanism including a manually operable part suited for causing visual display of sums of the price indicia of the tokens of individual groups so scanned.

References Cited in the file of this patent

UNITED STATES PATENTS

| | | |
|---|---|---|
| 1,361,791 | Carroll et al. | Dec. 7, 1920 |
| 1,658,022 | Campbell | Jan. 31, 1928 |
| 1,753,991 | Langford | Apr. 8, 1930 |
| 1,824,581 | Tripp | Sept. 22, 1931 |
| 1,825,141 | Brand | Sept. 29, 1931 |
| 1,974,191 | Nelson et al. | Sept. 18, 1934 |
| 2,018,420 | Robinson et al. | Oct. 22, 1935 |
| 2,059,277 | Rand et al. | Nov. 3, 1936 |
| 2,066,750 | Tripp | Jan. 5, 1937 |
| 2,155,928 | Brand | Apr. 25, 1939 |
| 2,226,919 | Gubelmann | Dec. 31, 1940 |
| 2,276,293 | Farmer | Mar. 17, 1942 |
| 2,353,002 | Armbruster | July 4, 1944 |
| 2,424,076 | Buhler | July 15, 1947 |
| 2,456,771 | Simone | Dec. 21, 1948 |
| 2,536,837 | Corey et al. | Jan. 2, 1951 |